Figures 1, 2:
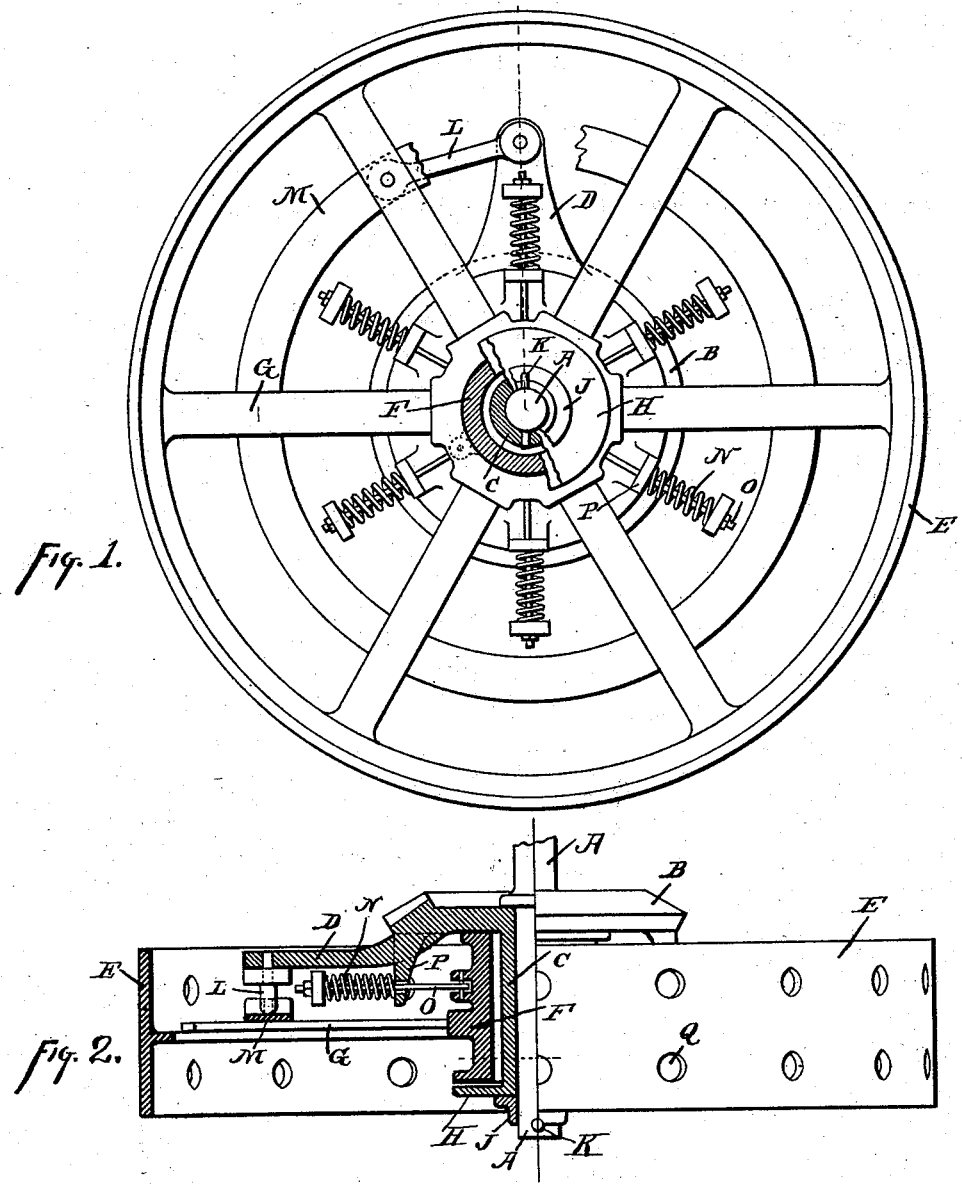

(No Model.)

I. N. DICK.
TRACTION WHEEL.

No. 455,481.  Patented July 7, 1891.

Witnesses:
P. P. Sheehan
W. S. Belden

Isaac N. Dick
Inventor
by James W. See
Attorney

UNITED STATES PATENT OFFICE.

ISAAC N. DICK, OF MILLVILLE, OHIO.

TRACTION-WHEEL.

SPECIFICATION forming part of Letters Patent No. 455,481, dated July 7, 1891.

Application filed April 11, 1891. Serial No. 388,525. (No model.)

*To all whom it may concern:*

Be it known that I, ISAAC N. DICK, of Millville, Butler county, Ohio, have invented certain new and useful Improvements in Traction-Wheels, of which the following is a specification.

This invention pertains to traction-wheels to be employed in that class of machines and implements in which the traction of the wheel upon the ground is depended upon, when forcibly rotated, to propel the machine forward, as in the case of traction-engines or in which when the implement is drawn along the traction of the wheel upon the ground is intended to force the wheel to rotate so as to serve in giving motion to mechanism about the implement, as in a mower or reaper. In the employment of such wheels upon engines or implements it is sometimes customary to fix the wheel to its axle, the axle in such case serving as means for transmitting the rotary motion from the traction-wheel to the mechanism which it operates, or from the motive power to the traction-wheel, and in other cases it is customary to make the traction-wheel loose upon its axle and to transmit the power to or from the traction-wheel by means of a gear carried by the wheel, and in some cases where a pair of traction-wheels are employed it is frequently customary to have one wheel fast to the axle and the other loose upon the axle, and again, in some cases it is customary to transmit the power to or from a pair of traction-wheels through the medium of compensating gearing, the two wheels being arranged for independent rotation by having one or both of them loose on the axle. My improvements are applicable to any of the conditions above referred to, it being entirely immaterial whether the wheel be fast or loose upon its axle. Where a traction-wheel as usually constructed receives or transmits its motion through gearing, as is generally the case, the center of the wheel must maintain a constant position with reference to some element of the gearing which is carried by the body of the machine or implement. Therefore great difficulty is experienced in satisfactorily interposing springs between the body of the machine or implement and the traction-wheel in order that the traction-wheels may support their load elastically.

My improvements will be readily understood from the following description, taken in connection with the accompanying drawings, in which—

Figure 1 is a side elevation of a traction-wheel exemplifying my improvements, certain parts being broken away to exhibit more clearly the construction to the rear of those parts; and Fig. 2, a plan of the wheel, half vertical section.

In the drawings, A indicates the axle, in connection with which the traction-wheel is to be employed; B, a gear upon the axle, by means of which the rotary motion is to be transmitted to or from the wheel, this gear being either fast or loose upon the axle, as conditions may require; C, the hub of this gear fitting the axle and fast or loose thereon, as conditions may require; D, an arm projecting radially from the gear B and intended to serve as means by which the rotary motion is transmitted from the gear to the traction-wheel or from the traction-wheel to the gear, according to the character of the machine upon which the wheel is employed; E, the tire of the traction-wheel; F, the hub of the traction-wheel having a bore very much larger than the axle or than the exterior of hub C in the case illustrated, so that the traction-wheel while normally concentric with the axle is at liberty to shift in any radial direction a short distance, whereby the traction-wheel becomes eccentric to the axle; G, the spokes of the traction-wheel of any usual construction and firmly secured in any usual manner to the hub and tire of the traction-wheel; H, a flange upon the outer end of hub C, the hub F of the traction-wheel being thus loosely confined endwise between gear B and flange H upon the hub of the gear; J, a washer on the axle outside the hub C, serving to typify usual means for retaining the traction-wheel upon the axle in case the wheel is loose upon the axle; K, the usual linchpin pertinent to such axle-washer; L, a link pivoted to the arm D and to a spoke of the traction-wheel, whereby the rotation of the traction-wheel is transmitted to or from the gear B; M, a ring to be rigidly secured to the spokes and serving as a mere expedient for distributing to all the spokes the tangential strain from link L; N, a series of radially-acting springs connected with gear B and with the hub of the traction wheel and tending to hold these two parts in a normal position of concentricity, but yielding under vertical strain upon the axle to permit the axle and gear B to move downward somewhat into a position eccentric to the traction-wheel, the illustrated exemplification showing these springs as radially-arranged spiral springs under compression; O, rods engaging the outer ends of the springs and passing through the springs and pivoted at their inner ends to the hub of the traction-wheel; P, projections from gear B, through which the rods O pass and on which the inner ends of the springs abut; and Q, perforations through the tire of the traction-wheel. Assume axle A to be mounted upon a machine—as, for instance, a traction-engine—and that the traction-wheel is to be turned by means of a pinion gearing into gear B, and that the axle is firmly connected with the body of the machine so as to rise or fall therewith, no springs being interposed between the axle and the body of the machine. Then of course the center of the axle will maintain a constant position with reference to the body of the machine and with reference to the driving-gear thereof, and the rising and falling of the axle, as the machine passes over irregular places, will not disturb the relationship of the driving-gear. The enforced rotation of gear B will be transmitted to the traction-wheel through link L; but the axle, and the machine carried by it, may rise and fall elastically within the traction-wheel, the springs yielding in an obvious manner, and the link L, forming a yielding coupling between the driving-gear and the traction-wheel so that the transmission is not interfered with by change of relationship between the traction-wheel and the gear B. The function of link L being thus understood many equivalents for it will suggest themselves as a means for coupling gear B to the traction-wheel. By this system of construction an elastic traction-wheel is secured, and the tractive force of the wheel is much increased by the perforations Q in the tire of the wheel, these perforations permitting soft matter to pass through the tire and enable the tire to reach hard ground and secure a better foothold.

The system is applicable to most any of the usual employments of traction-wheels. In the case above assumed, power was transmitted to the traction-wheel through gear B; but obviously power may be transmitted from the traction-wheel through gear B to mechanism of an implement operated by a traction-wheel. Gear B may be assumed as fast or loose upon axle A, according as whether axle A is employed as a rotary or non-rotary axle. If it be employed as a rotary axle to rotate with the traction-wheel, then gear B will be fast on the axle, for they rotate together, and gear B becomes virtually only a means for transmitting the rotary motion to or from the rotating axle, and in such case the gear B, as a gear, or as a means for transmitting motion between the rotary axle and the mechanism of the machine or implement may be fastened at any desired point on the axle, and then, so far as the traction-wheel is concerned, gear B becomes a mere plate to transmit motion between the traction-wheel and the rotary axle. In traction-engines employing compensating gearing between the two traction-wheels of a pair, gear B, in the form illustrated, may serve as one of the main gears of the compensating system, as usual. It will be noticed that hub C is a mere expedient for securing a long bearing of the plate or gear B upon the axle.

I claim as my invention—

1. In a traction-wheel, the combination, substantially as set forth, of an axle, a plate mounted thereon, a traction-wheel mounted upon said axle normally concentric thereto and having a hub of such large bore as to permit the traction-wheel to shift in all directions eccentrically with reference to the axle, a flexible coupling uniting said plate to said traction-wheel, so that they will rotate together, rods projecting radially from the exterior of the hub of the traction-wheel, and springs engaging said rods and said plate and tending to hold the traction-wheel into a position concentric to said axle.

2. The combination, substantially as set forth, of an axle, a traction-wheel mounted thereon, but having no journal-bearing, a plate on the axle, and radial springs connecting the plate and wheel and permitting the wheel to shift eccentrically in all directions with reference to the axle.

ISAAC N. DICK.

Witnesses:
J. W. SEE,
WM. S. GRIFFIN.